United States Patent
Douglass et al.

(10) Patent No.: US 7,561,587 B2
(45) Date of Patent: Jul. 14, 2009

(54) METHOD AND SYSTEM FOR PROVIDING LAYER-4 SWITCHING TECHNOLOGIES

(75) Inventors: Michael Douglass, Austin, TX (US);
Douglas Swarin, Austin, TX (US);
Edward Henigin, Austin, TX (US)

(73) Assignee: YHC Corporation, Austin, TX (US)

( * ) Notice: Subject to any disclaimer, the term of this patent is extended or adjusted under 35 U.S.C. 154(b) by 905 days.

(21) Appl. No.: 10/672,198

(22) Filed: Sep. 26, 2003

(65) Prior Publication Data

US 2004/0109447 A1 Jun. 10, 2004

Related U.S. Application Data

(60) Provisional application No. 60/414,205, filed on Sep. 26, 2002.

(51) Int. Cl.
*H04L 12/56* (2006.01)
(52) U.S. Cl. .................. 370/401; 709/245
(58) Field of Classification Search .......... 370/389, 370/390, 392, 401; 709/201–203, 230–237, 709/245
See application file for complete search history.

(56) References Cited

U.S. PATENT DOCUMENTS

| | | | |
|---|---|---|---|
| 6,119,162 A * | 9/2000 | Li et al. ............... | 709/227 |
| 6,337,862 B1 * | 1/2002 | O'Callaghan et al. ... | 370/392 |
| 7,142,509 B1 * | 11/2006 | Rovner et al. .......... | 370/390 |
| 7,227,838 B1 * | 6/2007 | O'Riordan ............. | 370/219 |
| 2002/0120763 A1 * | 8/2002 | Miloushev et al. ...... | 709/230 |
| 2002/0138628 A1 * | 9/2002 | Tingley et al. ......... | 709/227 |
| 2003/0069993 A1 * | 4/2003 | Na et al. ............... | 709/245 |
| 2007/0214282 A1 | 9/2007 | Sen | |

OTHER PUBLICATIONS

Network Load Balancing: Frequently Asked Questions for Windows 2000 and Windows Server 2003, Pub. Jun. 1, 2003 (23 pages).

* cited by examiner

*Primary Examiner*—Ricky Ngo
*Assistant Examiner*—Pao Sinkantarakorn
(74) *Attorney, Agent, or Firm*—Hulsey IP Intellectual Property Lawyers, P.C.

(57) ABSTRACT

Smart-Man's Layer 4 (SML4) is a process in which the TCP/IP stack is manipulated on a set of computer systems to enable Layer-4 switching (load balancing and failover) of a set of IP Addresses without the use of an expensive dedicated, specialized Layer-4 switch dedicated to performing the Layer-4 switching. SML4 supports any application which uses TCP stream sockets for data transfer. SML4 requires no special or non-standard handling of packets on the network switches the systems are connected to.

31 Claims, 3 Drawing Sheets

METHOD AND SYSTEM FOR PROVIDING LAYER-4 SWITCHING TECHNOLOGIES

CROSS-REFERENCES TO RELATED APPLICATIONS

This Application for Patent claims the benefit of priority from, and hereby incorporates by reference the entire disclosure of, U.S. Provisional Application for Patent Ser. No. 60/414,205, filed Sep. 26, 2002.

BACKGROUND OF THE INVENTION

1. Technical Field of the Invention

The present invention relates to Layer-4 switching.

2. Description of Related Art

Conventionally, Layer-4 (L4) switching (load balancing and failover) within a server farm or cluster has been performed by a separate specialized networking switch dedicated to only L4 switching. Since switching equipment is expensive, utilizing a separate networking switch increases the cost for implementing a server farm. In addition, routing traffic through the dedicated and separate L4 switch delays inbound traffic, thereby reducing connectivity speed at session establishment and during the session itself. Furthermore, the requirement of a dedicated and separate L4 switch places restrictions on the location of clients in relation to servers. Therefore, what is needed is an L4 switching mechanism that does not require a separate, dedicated L4 switch.

SUMMARY OF THE INVENTION

Embodiments of the present invention provide a Smart Man's Layer 4 (SML4) switching system and method that utilizes an Internet Protocol (IP) address shared on all systems in a cluster. All systems in the cluster are configured to respond to Address Resolution Protocol (ARP) requests for the shared IP with a configurable Media Access Control (MAC) address that is not a broadcast nor a multicast MAC address and also not in use on any Network Interface Card (NIC) on the subnet. All systems in the cluster have their NIC placed into promiscuous mode to capture inbound traffic sent to the shared IP address, MAC address as well as those destined for the native MAC address of the local system.

In certain embodiments, all systems in the cluster allow the full and complete processing of the packets destined for the shared IP address and the shared MAC address. All systems in the cluster prevent any TCP packets to be sent with the shared IP address and the shared MAC address. All systems in the cluster further prevent any TCP packets to be sent with the shared IP address when those packets have the RST flag set.

In further embodiments, all systems in the cluster are dynamically categorized as active or passive. Only a single system is classified as active at any given time, with all other systems in the cluster being classified as passive. A passive server drops all inbound ICMP packets and those TCP packets which have the SYN flag set. A passive server does not respond to requests for new TCP sessions, but does continue to process previously established session(s). An active server does not block inbound traffic and is responsible for establishing new TCP sesions. The decision making process for deciding which system in the cluster is to be active is based on various metrics measured on each system and shared with all of the systems within the cluster. The metrics are analyzed and a deterministic decision on a new active server is made by each system in the cluster. When a consensus on which system in the cluster should be the new active server is made, then the currently active server becomes classified as passive and the newly elected server transitions from passive to active.

In other embodiments where there is a requirement that subsequent connections from the same source IP be handled for a period of time by the same individual system, then a server in the cluster can be configured to be considered partially-active, wherein the server (active or passive) permits TCP packets with the SYN flag set to be processed when the packet is from specific IP addresses. In this embodiment, the active server drops any packets with the SYN flag set when the packets are from an IP address for which the active server is partially-passive.

Advantageously, embodiments of the present invention do not require any special networking equipment such as a specialized L4 switch for SML4 to function. SML4 allows the use of any standard networking equipment, as there are no special requirements or feature support necessary. SML4 performs standard L4 switching. In addition, there is an enormous cost savings by not needing to invest in separate L4 switching equipment, especially for small to medium server farms where the inbound traffic is significantly smaller than the outbound traffic produced by each server. Furthermore, since there is no individual piece of networking equipment handling the communication between client and server, there are no restrictions on the location of clients in relation to the servers. The clients can even be located on the same network as the L4 server farm.

Another advantage is that since there is no L4 switch performing traffic-cop like activities, the server connectivity speed is improved since the latency of the L4 decision making process is not necessary. This speed enhancement is experienced at session establishment time as well as per inbound packet from client to server. In addition, there is a savings of resources, since there is no need to perform health-checks of the services to ensure that they are listening and ready to handle requests. The process of calculating metrics is performed on the specified active host, and determined if a process that is ready and willing to listen to a request is available without actually performing a probe of the service.

Depending upon the support built into the underlying TCP-based application, SML4 can further assist in protecting a server farm from being overwhelmed by redirecting connections elsewhere on the Internet at-large. An example would be web and webcache redirection where all of the systems can agree that they are all equally overloaded and begin to redirect new connections to another server farm elsewhere on the Internet. Thus, multiple SML4 clusters can interoperate to share the load and protect each other from cases of an overloaded or a completely failed server cluster.

BRIEF DESCRIPTION OF THE DRAWINGS

The disclosed invention will be described with reference to the accompanying drawings, which show important sample embodiments of the invention and which are incorporated in the specification hereof by reference, wherein.

DETAILED DESCRIPTION OF THE EXEMPLARY EMBODIMENTS OF THE INVENTION

The numerous innovative teachings of the present application will be described with particular reference to the presently preferred exemplary embodiments. However, it should be understood that these embodiments provide only a few examples of the many advantageous uses of the innovative teachings herein. In general, statements made in the specification of the present application do not necessarily delimit any of the various claimed inventions. Moreover, some statements may apply to some inventive features, but not to others.

Figure 1:
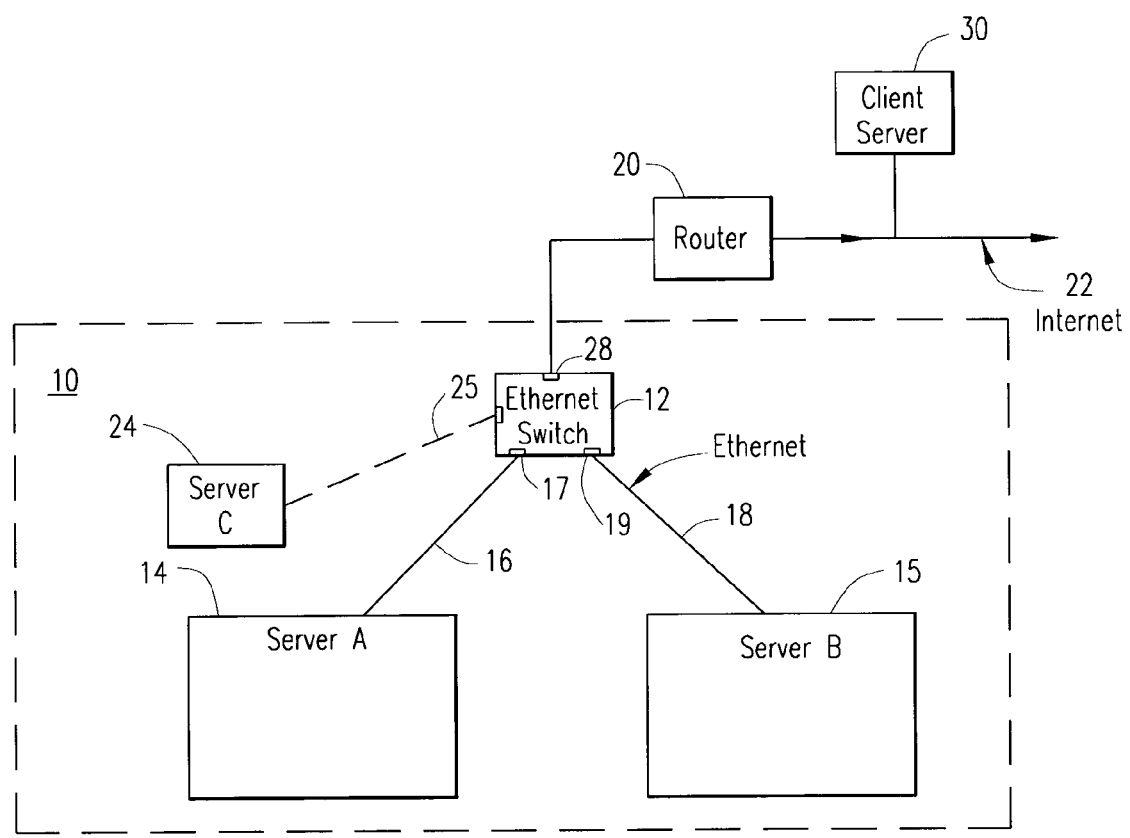
FIG. 1 is a block diagram of an exemplary SML4 system.

Referring to FIG. 1, an exemplary SML4 switch system 10 is depicted. A standard off the shelf generic ethernet switch 12 is used. The ethernet switch does not have software or firmware built into it for performing L4 switching. As such, the ethernet switch 12 is much less expensive than an L4 switch.

A server A 14 is connected to the ethernet switch 12 via ethernet line 16 and ethernet port 17. Likewise server B 15 is connected to ethernet switch 12 via ethernet line 18 and ethernet port 19. A router 20 is connected to the ethernet switch 12 via port 28 and links the ethernet switch 12 to the internet 22. There can be additional servers such as server C 24 connected to the ethernet switch. Preferably there are less than 6 servers connected to the ethernet switch although more than 6 servers can be accommodated by an exemplary SML4 switch as will be explained further in this specification. Each server is operating and running exemplary software or programs which set up the TCP/IP and ethernet layers of the exemplary SML4 switch system 10. The software or programs on each of the servers also make only one server an active server and the other servers connected to the ethernet switch 12 passive.

To clearly explain the exemplary embodiments of the present SML4 switch 10, which does not require an ethernet switch with built in L4 switching software, firmware or capabilities, first let's digress and discuss some basics.

Transmission Control Protocol/Internet Protocol (TCP/IP) is a suite of communication protocols used to connect two servers (i.e., hosts, systems) to each other for data or packet communications. The two main protocols used by TCP/IP are the Transmission Control Protocol (TCP) and the Internet Protocol (IP).

For IP to operate on an ethernet network it may utilize a Media Access Control (MAC) address, which uniquely identifies each node in a network.

Thus, server A 14 has its own IP address and MAC address. Server B 15 also has its own IP address and MAC address. It is understood that the IP addresses and MACs of servers A and B are different.

Furthermore, to understand the exemplary workings of the present SML4 switch, it is important to first understand how a generic ethernet switch 12 operates. Unlike an ethernet hub, an ethernet switch does not simply receive a packet in one port and repeat the received packet out of all the remaining ports of the ethernet hub. Instead, a generic ethernet switch 12 attempts to learn the ethernet MAC address of, for example, servers or other peripheral devices connected to the ethernet ports of switch 12. The ethernet switch attempts to learn the MAC addresses associated with the servers and devices connected to its ports by reading the MAC addresses of packets received at each of the ethernet ports 17, 19, 25 and 28. Thus, when server A 14 sends a packet to, for example, the internet 22, the packet will indicate the MAC address of server A 14. The ethernet switch 12 will, in the process of sending the packet, read and learn the MAC address associated with server A 14. The ethernet switch will then send all packets addressed to server A's MAC address only out of port 17 to server A 14 instead of out of all the ports.

It is also important to understand that a generic ethernet switch will transmit a packet of data out of all its ports (except the port the packet was received in), much like an ethernet hub until the ethernet switch learns which MAC addresses should be sent out of specific ports. In short, a generic ethernet switch 12 receives data packets or traffic in any one of its ports and attempts to send the data packets out of a port that services the MAC address to which the data packet is being sent. If the ethernet switch does not recognize the destination MAC address, then the ethernet switch sends the data packet out of all of its ports (except the receiving port) on the premise that a return packet will be generated and received by a port of the ethernet switch enabling the ethernet switch to learn a proper association of a MAC address and port.

In an exemplary SML4 switch, each server, A, B, C, etc., as explained above, has its own TCP/IP address. As with standard L4 switches from Cisco, Foundry or other L4 switch manufacturers, a virtual address is assigned to the exemplary SML4 switch. Unlike the standard L4 switching technology, wherein the L4 switch is given the virtual address, in exemplary SML4 switches, each server (server A, B, C, etc.) is assigned the same virtual TCP/IP address, such as 192.168.2.5.

Each of the servers A, B, C (14, 15, 24) are also assigned the same virtual ethernet MAC address for sending out when they are asked, via an ARP request, the MAC addresses associated with the virtual address. The servers A, B, C (14, 15, 24) never transmit an ethernet packet with the virtual MAC address. The reason for never transmitting an ethernet packet with the virtual MAC address is that it makes it impossible for the ethernet switch to learn a proper association of a MAC address with a particular port. Thus when the switch sends data to the virtual MAC address, the switch sends the data out all of its ports (except the port the data was received on). Explained differently, the ethernet switch 12 will send data packets addressed to the virtual MAC addresses to its ports having servers connected to them, but never sees the virtual MAC address returned via the ports to the ethernet switch. Instead, the ethernet switch only sees a data packet indicating it came from the individual server A, B, or C (14, 15, 24). Thus, the generic ethernet switch 12 cannot learn to associate a single port with the virtual address. Thus, whenever the ethernet switch receives a data packet for the virtual address, the data packet is sent out of the ethernet ports to all the servers A, B, C.

The IP layer of the exemplary SML4 switch is thus operational because if a TCP/IP session is being transferred from the internet to the virtual IP address, then any packets, any traffic, any information coming from the internet to the virtual IP address is broadcast via the generic ethernet switch 12 to all the servers 14, 15, 24 on that ethernet network.

The ethernet switch 12 can learn MAC addresses coming from the router 20. Thus, when a server 14, 15, 24 sends data packets destined for a client server 30, the data packets are not transmitted out of each ethernet switch port to all the other servers so that packet collisions and ethernet congestion do not occur.

To reiterate, the IP layer of an exemplary SML4 switch is established via the usage of virtual MAC addresses being announced by the servers A, B, C (12, 15, 24) in response to ARP requests connected to the generic ethernet switch 12, by utilizing an ethernet switch that upon receipt of data packets received at port 28 for the virtual IP address, the ethernet switch 12 sends the data packets received to all the servers A, B, and C connected to the ethernet switch 12. Data packets coming from a server, be it server A, server B, etc., go into the ethernet switch 12 and are not sent to all the ports on the ethernet switch, but instead only to port 28 toward the router 20 and the internet 22.

With respect to the ethernet layer of the exemplary SML4 switch each server A, B, and C must be set up to not only receive data packets on their real IP address and MAC address, the servers are also set up to accept data packets from the virtual TCP/IP address (e.g., 192.168.1.5). As such, each server is also set up to receive data packets addressed to the same virtual MAC address.

To review, each server A, B, and C (14, 15, 24) connected to the ethernet switch 12 will always receive data addressed to the same virtual MAC address. If a server is queried as to what a MAC address is for the servers unique IP address, each server A, B, and C will provide its own real MAC address. Each server's real MAC address is different from the virtual MAC address. Furthermore, each server has a different real MAC address. When any of servers A, B, or C transmits data to a client or client server 30 via the internet switch 12 and router 20, each server sends its real or actual MAC address with the data, never the virtual address.

For the exemplary SML4 switch to properly perform in accordance with the standard TCP protocol, the TCP layer of each server 14, 15, 24 must also operate to the requirements of SML4 switching protocol. Whenever data packets are being sent from the internet to the virtual address, every server 14, 15, 24 will receive the data packets. Under a normal situation, when a new TCP session is being created, every server will try to acknowledge the connection from the client 30 as its very own connection. In order for SML4 to properly function like an L4 switch, a software application runs on each server. The software application requires that the servers A, B, and C share their metrics with each other and set up one of the servers, for example, server A 14, as the active server. If server A 14 is the active server, then, servers 15 and 24 would be designated as passive. There can only be one active server among the cluster of servers connected to the ethernet switch 12. The active server A is the only server in among the servers 14, 15, 24 connected to the internet switch 12 that handles the acceptance of new connections at for the time it is selected as the active server. The passive servers 15, 25 ignore all inbound packets for the virtual IP address (the L4 IP address) with a SYN flag set. The reason for having the passive servers ignore receipt of the virtual IP address with the SYN flag set is that the standard three step TCP communication handshake begins with the initiator of the connection (in this case the initiator is the client server 30) sending a packet to the SML4 server having the virtual address and the SYN flag set.

Only the active server 14 is responsible for sending a packet back to the initiator of the connection with a SYN ACK thereby setting up the connection with the initiator (client server 30). The passive servers also drop all inbound Internet Control Message Protocol (ICMP) packets because only one server 14 needs to receive ICMP packets.

The passive servers B and C 15, 24 will not try to establish a connection, instead they will disregard inbound packets with the SYN flag set and will not send a SYN ACK to the client initiator because they are not participating in a TCP handshake. If a server B received data packets destined for a session established on another server A, the said server B would not have established a handshake with the initiator and thus would not recognize the connection. If server B responds, server B would try to reset the connection because of the unrecognized connection state. Thus, firewall rules for all servers are altered to stop any server from sending a reset packet for any received packet not recognized as part of a connection on the given server.

The exemplary SML4 switch system that operates like an L4 switch, but costs significantly less to implement, is limited to the bandwidth of the 16, 18, 25 ethernet going to each server. That is the servers A, B, and C should not be trying to receive, in aggregate, packets of data via the generic ethernet switch 12 at a data rate higher than the capabilities of the ethernet 16, 18, 25. At present, ethernet has bandwidths of about 10, 100, and 1000 Mbps. An exemplary embodiment of the present SML4 switch will operate very well as technology advances and the bandwidth of ethernet increases.

Exemplary SML4 switch systems require, at a minimum, a generic ethernet 12 switch or a reasonable facsimile thereof to operate. The IP layer, the ethernet layer, and the TCP layer must all be controlled by the clustered servers A, B, and C (14, 15, 24). The clustered servers 14, 15, 24 must operate in a symbiotic relationship with the generic ethernet switch 12 in order to function as if it were a dedicated L4 switch.

An exemplary SML4 switching system and method has one or more of the following additional features or requirements that clarify and add to the discussion above with respect to FIG. 1:

The servers 14, 15, 24 respond to ARP requests for the virtual L4 address (virtual IP address) with an unused MAC address (virtual MAC address) that is not found on the ethernet. The chosen virtual MAC address should not be a broadcast address nor a multicast address. By not existing on any device on the ethernet, the virtual MAC address of the SML4 switch allows the exemplary SML4 switch 10 to function with substantially any standard networking equipment without the need to hard code any information on the routers and switches on the network. Any Layer 2 (L2) switch, such as a generic ethernet switch, on the network will broadcast packets destined for the L4 address on all of the L2 switch's ports due to the fact that the MAC address associated with the L4 address is not in use on the network thereby preventing the L2 switches from discovering any single port to use when sending the traffic.

An ethernet card associated with a server 14, 15, 24 receives packets from the ethernet switch 12 destined for MAC addresses other than its own. The receipt of a MAC address other than the ethernet cards own MAC address is due to the fact that the L4 IP address is announced as being a non-existent MAC address to which each server A, B, C (14, 15, 24) must process. A server can be forced to process the packets destined for a non-existent MAC address by simply placing the network interface into promiscuous mode.

The TCP/IP stack of each server running SML4 processes or software allows the receipt and processing of packets destined for a MAC address not listed on the server's ethernet interface. This modification can be accomplished by a simple modification to the software of the TCP/IP driver directly. Without this modification the kernel would double-check the MAC address of the packet to verify that the MAC is a valid MAC address for the given network interface. In order for the exemplary SML4 to work properly, the packet must be received and processed through the TCP/IP stack as if it were destined for each host.

Each server is configured to accept and processes TCP packets for the virtual L4 (virtual MAC address) address in use. This is done by adding the L4 address to the loopback interface of the system.

Due to the dynamic nature of the SML4 switch 10, there is a process by which metrics are gathered and that decisions are made as to which server A, B, or C (14, 15, 24) in the SML4 cluster will be the active server and handle new inbound sessions. The metrics used to determine who should process new connections can be determined on any factor measurable on the server including, but not limited to: the number of connections each server in the cluster has, CPU utilization, load average, measures of performance to end-user, and any other measure of performance which can reasonably be measured. The load balancing or decision effecting which server A, B, or C (14, 15, 24) in the SML4 system 10 should be the active server and take new connections is handled by having each server broadcasting information to all peer servers in the cluster. A consensus is reached via the measurable factors from each server on which server should be the server taking new connections.

Furthermore, multiple SML4 clusters have the ability to communicate with each other as well as with other external processes in order to interoperate with each other and to perform redirection of services to alternate farms if deemed necessary for load/failure reasons.

Figure 2:
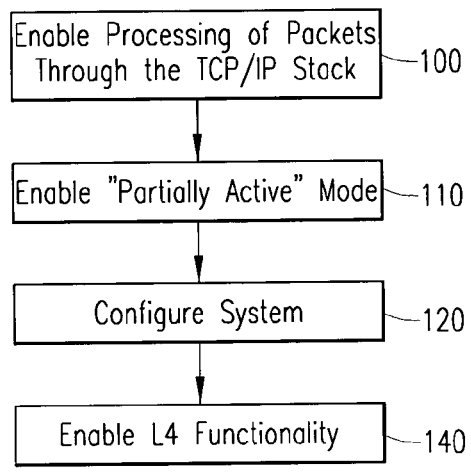
FIG. 2 is a flowchart illustrating exemplary steps for configuring the SML4 system.

Referring now to FIG. 2, to initialize an exemplary SML4 system switch, at step 100, the operating system of each server A, B, and C (14, 15, 24) in the cluster is modified to allow packets destined for MAC addresses other than the network interface card's native MAC address to be fully processed through the TCP/IP stack. This allows packets destined for the virtual MAC address to be processed. This is a one time task and is done as a change to the kernel code. At step 110, the operating system of each server 14, 15, 24 is also modified to enable the addition of remote source IP addresses as partially active or partially passive when the server accepts a connection from a source IP to an L4 address which requires that functionality. To add a remote source IP as partially active, a firewall rule is installed with a higher precedence than the firewall rules for the passive mode in order to allow TCP packets with the SYN flag set originating from the specified source IP and destined for the L4 address. In addition, a timer is set to timeout the partially active firewall rule. To add a remote source IP as partially passive, a firewall rule is installed to block TCP packets with the SYN flag set originating from the specified source IP and destined for the L4 address. In addition, a timer is set to timeout the partially passive firewall rule.

Thereafter, at step 120, configuration of each server A, B, and C (14, 15, 24) in the server cluster is performed (also a one time task), specifying various configuration variables, including, but not limited to, the shared virtual IP address (L4 address), the virtual MAC address for the shared IP address, the update interval (time between sending of update packets), and the learn time (time in which the software does not attempt to become the active system after the SML4 software is started). Step 120 is where the configuration files are written and stored in each server A, B, and C (14, 15, 24). Finally, at step 130, the SML4 software is started on the system. This is often done upon boot of the servers A, B, and C (14, 15, 24) or whenever the L4 functionality is actually desired.

Figure 3:
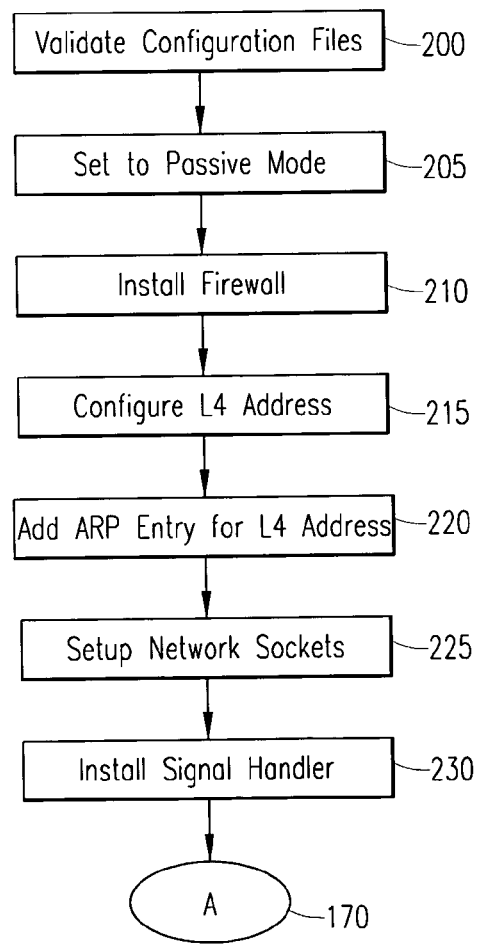
FIG. 3 is a flowchart illustrating exemplary steps for beginning the SML4 process.

Referring now to FIG. 3, upon starting the SML-4 software on each server in the exemplary SML-4 system 10, at step 200, the configuration file is read and validated for accuracy. In addition, at step 205, each sever is set to passive mode at start up by installing a firewall rule to block inbound ICMP for the L4 address and a firewall rule to block inbound TCP packets with the SYN flag set for the L4 address. Each server staffs up in passive mode for a limited amount of time while the server determines how many other servers are operating in the cluster, what their addresses are, which server is in active mode, and which servers are operating the SML-4 software. Thereafter, at step 210, firewall rules are installed in each server to block outbound TCP packets coming from the L4 address (virtual address) with the RST flag set. At step 215, the L4 address is configured as an alias on the loopback interface of the system. In other words, software is instructing the server to accept TCP packets on the virtual IP address. At step 220, a static and published ARP entry is added to the kernel's ARP table for the L4 address using the configured MAC address. This step essentially tells the server to provide the virtual MAC address in response to ARP requests for the virtual IP address.

Thereafter, at step 225, network sockets are set up for the transmission and reception of cluster metric broadcasts in order to allow each server A, B, and C to send and receive metrics and information about the other servers. At step 230, a signal handler is installed to allow external notification for the SML4 process to exit cleanly. If a server is the active server and the SML4 software must exit, the server is put in passive mode forcing another server to be selected as active. The server that is exiting will inform the other servers that it is no longer accessible as part of the SML4 switch system 10. Finally, at step 235, the software enters the main process loop, which is described in more detail below in connection with FIG. 4.

Figure 4:
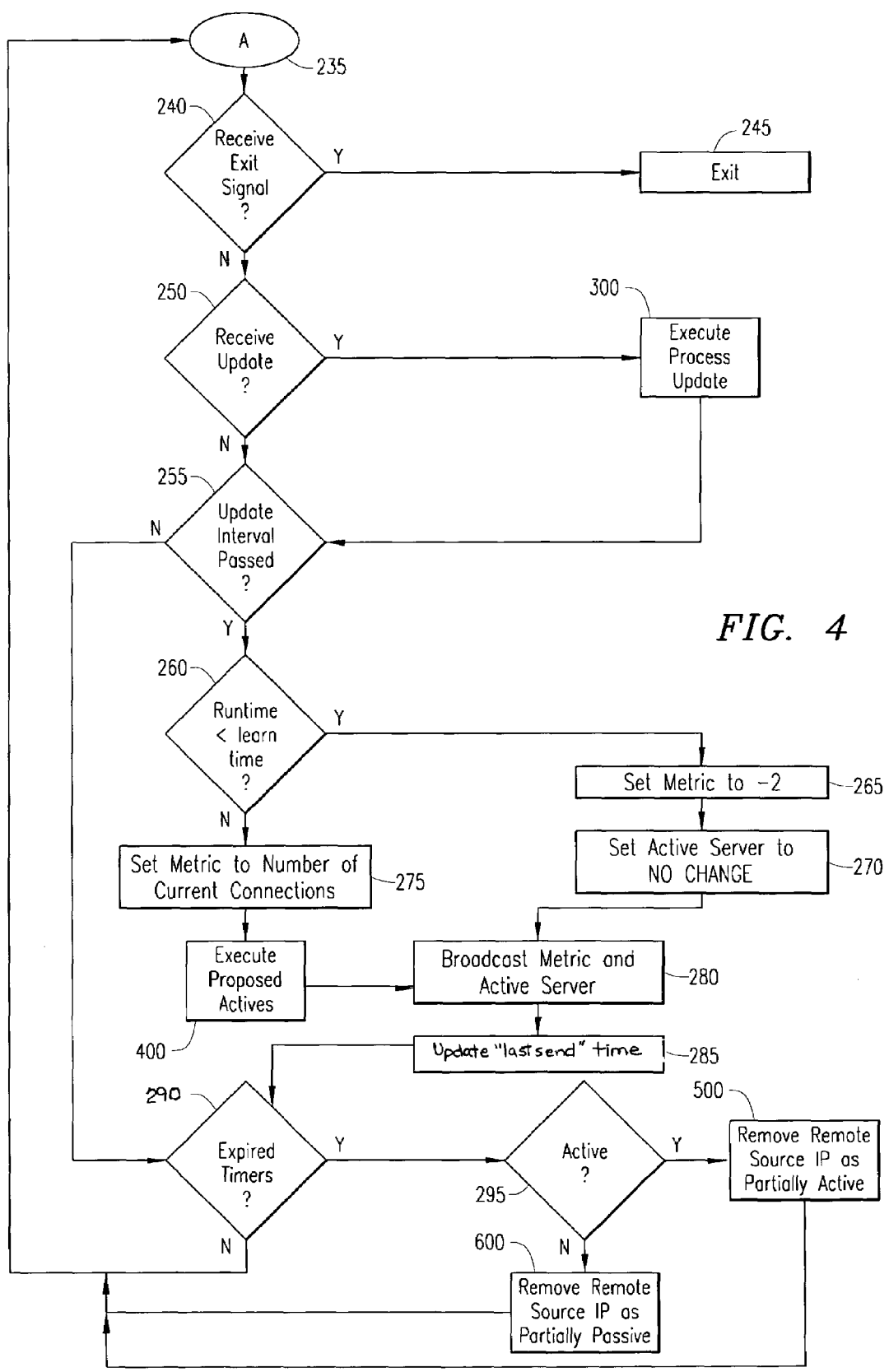
FIG. 4 is a flowchart illustrating exemplary steps for performing the SML4 process.

Referring now to FIG. 4, this flow chart represents the operations on each server in the SML4 switch. Each server 14, 15, 24 has the same SML4 software operating on it. At step 240, if a signal to exit has been received by the server, the server state is set to passive mode (as described above), and at step 245, the process exits. Essentially the server takes itself out of the pool of potentially active servers. If an exit signal has not been received, at step 250, a determination is made whether any updates have been received from peer systems in the cluster. If so, at step 255, the system updates are executed at step 300.

To execute system updates, the system checks the information received from peers for an indication of a consensus to change of the active server, and if the server is the old active server, the server state is set to passive mode, as described above. However, if the server is the new active server, then the server state is set to active mode. To transition to active mode, the server's firewall rules for blocking inbound ICMP for the L4 address (virtual IP address) and TCP packets with the SYN set for the L4 address are removed.

If there is not an indication of a consensus for an actual change in active server, then the server updates in-memory metrics and "active server" proposals for the other servers in the cluster with the information received in the network broadcast from other servers in the cluster. If any Partially Active notices are received from other servers in the cluster, the server adds the remote source IP address as partially active, as described above.

Thereafter, at step 255, if a configurable amount of time known as the "update interval" has passed since the "last send", and at step 260, if the software system has been running less than "learn time" seconds, at step 265, the local system metric is set to −2 or to any variable indicating that the server is not available to be the active server. At step 270, the proposed active server is set to NOCHANGE. Otherwise, if the SML4 software has been running on the server more than the learn time amount of seconds then at step 275, the metric is set to the number of connections currently being handled by the server and determines, based on analyses of the proposed active servers, who should be the active server at step 400.

To determine who should be the active server, the system analyzes the metrics of all systems in the cluster and uses a deterministic algorithm to determine which server in the cluster should be the active server. If the metric of the proposed new would-be active server does not differ from the metric of the current active server by a configurable value known as the "metric step", the proposed active server is set to nochange and step 400 is complete. If the new would-be server is the current existing active server, the proposed active server is set to nochange and step 400 is complete. This process is repeated for all proposed active servers of all systems in the cluster (ignoring any servers with a negative (timed out or learning) metric).

A metric is a measure of some aspect of performance of a server. The metric of each server in the cluster is numerically comparable. For example, the metric of each server may be the number of connections the server has, the CPU usage of the server, the amount of memory or storage retrievals per second, or some mathematical combination of various metrics. In essence, the metric of each server gives a relative sense of the remaining capacity of each server, when compared to the metric of another server.

If there is an absolute consensus between the clustered servers regarding whether the proposed new would-be active server has a metric greater than the metric of the current active server by more than the "metric step". Then the active server serial number is incremented and the active server is set to the address of the new active server (this is broadcasted with the metric information). In addition, if a server is the old active server, the server's state is set to passive mode, as described above. However, if a server is the new active server, the server's state is set to active mode, as described above.

Thereafter, at step 280, the server sends out a broadcast with the newly updated metric and proposed active server information, and at step 285, the server updates the "last send" with the current time. Thereafter, at step 290, the server looks for expired timers in Partially Active/Passive entries, and at step 295, if there are expired timers for partially active entries, at step 500, the server removes the partially active firewall rule for the partially active remote source IP address. If there are expired timers for partially passive entries, the server removes the partially passive firewall rule for the partially passive remote source IP address. This process repeats starting again at step 235 until an exit signal is received.

As will be recognized by those skilled in the art, the innovative concepts described in the present application can be modified and varied over a wide range of applications. Accordingly, the scope of patented subject matter should not be limited to any of the specific exemplary teachings discussed, but is instead defined by the following claims.

We claim:

1. A system configured to function as a layer 4 switch, the system comprising:
    a layer 2 switch having a plurality of ports, wherein a third port of the plurality of ports is configured to be in communication with a client;
    a first server configured to be in communication with a first one of the plurality of ports;
    a second server configured to be in communication with a second one of the plurality of ports;
    wherein the first server has a real IP address and a real MAC address;
    wherein the second server has a real IP address and a real MAC address;
    wherein the real MAC address of the second server and the real MAC address of the first server are different from one another;
    wherein the first server and the second server share a virtual IP address and a virtual MAC address;
    wherein the shared virtual MAC address is different from the real MAC address of the first server and different from the real MAC address of the second server;
    wherein the shared virtual IP address is different from the real IP address of the first server and different from the real IP address of the second server;
    wherein the first server and the second server are configured to provide the shared virtual MAC address responsive to an ARP request received by both the first server and the second server for the shared virtual IP address;
    wherein each of the first server and the second server is configured to provide its real MAC address responsive to an ARP request for its real IP address.

2. The system of claim 1, wherein the layer 2 switch is an ethernet switch.

3. The system of claim 2, further comprising an IP layer, a TCP layer and an ethernet layer are configured to operate in accordance with layer 4 switching protocol.

4. The system of claim 1, wherein only one of the first server and the second server can be an active server for accepting new connections from the client.

5. The system of claim 1, wherein neither the first server nor the second server transmits data with the shared virtual MAC address via the layer-2 switch to a client or client server.

6. The system of claim 5, wherein each of the first server and the second server transmits data with its real MAC address via the layer-2 switch to a client or client server.

7. The system of claim 5, wherein the only one of the first server and the second server can be an active server such that only the active server accepts new connections.

8. The system of claim 5, wherein at least one of the first server and the second server is a passive server such that the passive server drops all inbound packets having the virtual IP address with a SYN flag set.

9. The system of claim 5, wherein at least one of the first server and the second server is a passive server, the passive server continues to process a previously established session and does not establish a new session.

10. The system of claim 1, further comprising at least one server(s), wherein each one of the at least one server(s) is configured to be in communication with a different port of the plurality of ports.

11. The system of claim 10, wherein each of the at least one server(s) is configured to function with the first server, the second server and the layer 2 switch as a layer 4 switch.

12. The system of claim 1, wherein the only one of the first server, the second server and the at least one server(s) can be an active server such that only the active server accepts new connections.

13. The system of claim 12, wherein each one of the first server, the second server and each one of the at least one server(s) that is not the active server are passive servers.

14. The system of claim 13, wherein each one of the passive servers continues to process any previously established session and does not establish a new session.

15. The system of claim 13, wherein if one server of the first server, the second server and the at least one server(s) becomes configured to be a partially active server for a particular IP address, then the other servers of the first server, the second server and the at least one server(s) are configured to partially be passive for the particular IP address.

16. The system switch of claim 13, wherein the first server, the second server, and the at least one server(s) are configured to determine which server should be the active server.

17. The system of claim 13 wherein the first server, the second server, and the at least one server(s) are configured to communicate with each other via the layer 2 switch in order to determine which server should be the active server.

18. The system of claim 17, wherein the determination of which switch should be the active switch is based on a comparison of a metric associated with each server.

19. A method of creating a layer 4 switch comprising:
   configuring a plurality of servers to each have a real IP address and a real MAC address, wherein the real IP address and the real MAC address of each of the plurality of servers is different from one another;
   configuring the plurality of servers to each have a shared virtual IP address, the shared virtual IP address being different from the real IP addresses of the plurality of servers;
   configuring the plurality of servers to each have a shared virtual MAC address for the virtual IP address, the shared virtual MAC address being different from the real MAC addresses of the plurality of servers;
   establishing a communication path between the plurality of servers and a layer 2 switch such that each one of the plurality of servers is configured to be in communication with a different port of a plurality of ports of the layer 2 switch;
   configuring the plurality of servers to provide the shared virtual MAC address responsive to an ARP request received by the plurality of servers for the virtual IP address; and
   wherein each of the plurality of servers is configured to provide its real MAC address responsive to an ARP request for its real IP address.

20. The method of claim 19, further comprising establishing one of the plurality of servers to be an active server and configuring the remaining ones of the first server, the second server, and the at least one server(s) to be passive servers; the active server being configured to be able to set up new connections with the client.

21. The method of claim 20, further comprising the plurality of servers communicating with each other via the layer 2 switch at configurable intervals and determining whether the active server should remain the active server or whether another one of the plurality of servers should become the active server.

22. The method of claim 20, further comprising configuring each of the plurality of servers such that a TCP layer, an IP layer, and a layer 2 protocol acts as the layer 4 switch.

23. The method of claim 22, wherein the layer 2 switch is an ethernet switch and the layer 2 protocol is ethernet.

24. The method of claim 19, further comprising configuring each of the plurality of servers such that a TCP layer, an IP layer, and a layer 2 protocol acts as the layer 4 switch.

25. The method of claim 24, wherein the layer 2 switch is an ethernet switch and the layer 2 protocol is ethernet.

26. The method of claim 24, further comprising establishing one of the plurality of servers to be an active server and configuring the remaining ones of the first server, the second server, and the at least one server(s) to be passive servers; the active server being configured to be able to set up new connections with the client.

27. The method of claim 26, further comprising changing the active server to a different one of the plurality of servers.

28. A switch comprising:
   a plurality of servers, each server configured to have a shared virtual IP address that is the same and a configurable shared virtual MAC address for the virtual IP address;
   a layer 2 switch having a plurality of ports, one of the plurality of ports being for communicating with a client;
   a communication path between each one of the plurality of servers and the plurality of ports such that a subnetwork is created between the plurality of servers;
   wherein the plurality of servers are configured to provide the shared virtual MAC address responsive to an ARP request for the shared virtual IP address;
   wherein, responsive to receiving the shared virtual MAC address by the layer 2 switch, the layer 2 switch fails to associate an actual MAC address of the plurality of servers with at least one port of the plurality of ports causing the layer 2 switch to broadcast data destined for the virtual IP address to each server of the plurality of servers; and
   wherein only one of the plurality of servers is designated as an active server that establishes new connections with the client, the plurality of servers utilizing the subnetwork at configured intervals to aid in a determination of which server should become the active server.

29. The switch of claim 28, wherein the determination of which one of the plurality of servers should become the active server is based on a comparison of at least one metric of each one of the plurality of servers.

30. The switch of claim 28, wherein the plurality of servers, in combination with the layer 2 switch, are configured to establish an IP layer, a TCP layer and a subnetwork layer to act as a layer 4 switch.

31. The switch of claim 30, wherein the subnetwork is ethernet.

* * * * *